(12) United States Patent
Tiwari et al.

(10) Patent No.: US 11,578,557 B2
(45) Date of Patent: Feb. 14, 2023

(54) REVERSE STAGE CEMENTING SUB

(71) Applicant: Saudi Arabian Oil Company, Dhahran (SA)

(72) Inventors: Shrikant Tiwari, Dhahran (SA); Opeyemi Adewuya, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 163 days.

(21) Appl. No.: 16/997,698

(22) Filed: Aug. 19, 2020

(65) Prior Publication Data

US 2022/0056781 A1 Feb. 24, 2022

(51) Int. Cl.
| | |
|---|---|
| *E21B 33/14* | (2006.01) |
| *E21B 34/10* | (2006.01) |
| *E21B 21/10* | (2006.01) |
| *G06K 19/07* | (2006.01) |

(52) U.S. Cl.
CPC .............. *E21B 33/14* (2013.01); *E21B 21/10* (2013.01); *E21B 34/10* (2013.01); *G06K 19/0723* (2013.01); *E21B 2200/05* (2020.05)

(58) Field of Classification Search
CPC ...... E21B 33/14; E21B 34/10; E21B 2200/05; E21B 2200/06; E21B 21/10; E21B 33/13; G06K 7/10366; G06K 19/0723
See application file for complete search history.

(56) References Cited

U.S. PATENT DOCUMENTS

| | | |
|---|---|---|
| 5,358,048 A | 10/1994 | Brooks |
| 5,368,098 A * | 11/1994 | Blizzard, Jr. ......... E21B 33/146 |
| | | 166/387 |
| 5,494,107 A | 2/1996 | Bode |
| 6,209,663 B1 | 4/2001 | Hosie |
| 6,244,342 B1 | 6/2001 | Sullaway et al. |
| 6,679,336 B2 | 1/2004 | Musselwhite et al. |

(Continued)

FOREIGN PATENT DOCUMENTS

| | | |
|---|---|---|
| AU | 2014206227 A1 | 2/2015 |
| CA | 2547254 A1 | 12/2006 |

(Continued)

OTHER PUBLICATIONS

ISRWO issued for PCT/US2021/046431 mailed Oct. 14, 2021, 18 pages.

*Primary Examiner* — Michael R Wills, III
(74) *Attorney, Agent, or Firm* — Bracewell LLP; Constance G. Rhebergen; Keith R. Derrington (57) ABSTRACT

A system and method of reverse stage cementing in which flow into a casing string from an annulus between the casing string and wellbore walls is pressure dependent; the flow is blocked after stage completion. The flow enters the casing string through a cementing sub integrally formed in the casing string. A flapper valve is in a sidewall of the cementing sub that opens when pressure in the annulus reaches a threshold value, and remains open until the annulus pressure falls below the threshold value. Flapper valve actuation is controlled by a hinge spring that is calibrated to open and close the flapper valve based on the annulus pressure. Also in the cementing sub is a sleeve that is positioned behind the flapper valve after the reverse stage cementing is completed. Sleeve actuation is timed to allow adequate time for the flapper valve to return to the closed position.

17 Claims, 12 Drawing Sheets

(56) References Cited

U.S. PATENT DOCUMENTS

| | | | |
|---|---|---|---|
| 8,286,717 B2 | 10/2012 | Giroux et al. | |
| 8,978,750 B2 | 3/2015 | Noske et al. | |
| 9,562,419 B2 | 2/2017 | Fleckenstein et al. | |
| 10,174,586 B2 * | 1/2019 | Symms | E21B 34/066 |
| 2012/0247767 A1 * | 10/2012 | Themig | E21B 33/14 |
| | | | 166/321 |
| 2014/0076560 A1 | 3/2014 | Kenyon et al. | |
| 2014/0305662 A1 | 10/2014 | Giroux et al. | |
| 2015/0027706 A1 | 1/2015 | Symms | |
| 2015/0337624 A1 | 11/2015 | Themig et al. | |

FOREIGN PATENT DOCUMENTS

| | | |
|---|---|---|
| CA | 2932093 A1 | 10/2013 |
| WO | 2016014253 A1 | 1/2016 |

* cited by examiner

REVERSE STAGE CEMENTING SUB

BACKGROUND OF THE INVENTION

1. Field of Invention

The present disclosure relates to a system and method for a reverse cementing stage conducted in conjunction with a through casing cementing stage.

2. Description of Prior Art

Hydrocarbons that are produced from subterranean formations typically flow from the formation to surface via wellbores that are drilled from surface and intersect the formation. The wellbores are often lined with a casing string which is usually bonded to the inner surface of the wellbore with a wellbore cement. In addition to anchoring the casing within the wellbore, the cement also isolates adjacent zones within the formation from one another. Without the cement isolating these adjacent zones a potential exists for communication of gaseous formation fluids through cracks and microannuli. This gas communication can cause pressure buildup behind the casing to possibly reduce the hydrocarbon producing potential of the wellbore, or present a hazard to safe operation of surface facilities installed to recover hydrocarbons.

Cementing operations typically involve depositing a designated amount of cement slurry into the casing string, forcing the cement slurry through the casing string causing the slurry to exit from a lower end of the casing string and to then flow back up into the annulus between the casing string and walls of the wellbore. A technique used to estimate what amount of cement slurry to deposit into the casing is based on the annulus volume in which the cement is being injected. To force the cement slurry downward through and from the casing string, and then upward in the annulus; a plug is landed on top of the cement slurry column, and pressurized fluid is added into the casing string above the plug to push the plug, and the cement slurry, downward through the casing string. A shoe track is usually included on a lower end of the casing string, which often includes a landing collar, float collar and float shoe. Depending on the cement job design, one or two plugs (top and bottom plugs) are used to provide proper isolation between the drilling fluid and cement to avoid cement contamination. An increase in pressure is generally relied on to confirm that the top plug has reached the landing collar, and which coincides with the end of the first stage cement job. During the curing process the cement turns into a gel prior to becoming a set cement, while in the gel state hydrostatic pressure decreases and potentially allows formation fluid to flow into the well. The gel like cement is subject to contamination from the formation, and which can create a channel through the cement column in the annulus. If this channel extends all the way to surface from the casing shoe depth, surface equipment will be exposed to formation fluid and pressure. Sometimes multistage cementing is performed to as pressure barriers to these channels. Multistage cementing systems packers and valve systems that are complicated and prone to malfunction or failure.

SUMMARY OF THE INVENTION

Disclosed herein is a method of cementing a wellbore which includes providing communication between an annulus disposed between a casing string and walls of the wellbore and inside of the casing string through a reverse stage cementing sub that is at a depth adjacent an upper end of a column of set cement formed in the annulus from a previous cementing operation, ensuring the annulus is free of fluids originating from a formation surrounding the wellbore by generating a flow from the annulus into the casing string through the reverse stage cementing sub, introducing a cement slurry into the annulus, putting a flow barrier into a closed configuration to block communication between the annulus and casing string through the reverse stage cementing sub, maintaining the flow barrier in the closed configuration, and spacing initiation of the step of maintaining the flow barrier after initiating the step of putting the flow barrier into the closed configuration, and by an amount at least that of a duration for conducting the step of putting the flow barrier into the closed configuration. The step of providing communication between the annulus and the casing string optionally involves opening a pressure actuated valve disposed in a sidewall of the reverse stage cementing sub by pressurizing the annulus. In an example, spacing is performed by a hydraulic timer. The method further optionally includes dropping an RFID tag into the annulus, wherein when the RFID tag is proximate the reverse stage cementing sub the RFID tag sensed by an RFID sensor disposed in the reverse stage cementing sub and initiates operation of the hydraulic timer in response to sensing the RFID tag. In an alternative, deploying the flow barrier includes reducing pressure in the annulus to below a set pressure to close the pressure actuated valve, and where the pressure in the annulus is lowered to below the set pressure at about the same time the RFID tag is sensed by the RFID sensor. Upon completion of the time span a biasing means is optionally allowed to expand from a compressed configuration and urges a sleeve axially adjacent the pressure actuated valve. In an embodiment the pressure actuated valve is a flapper valve mounted inside the reverse stage cementing sub by a spring that is calibrated so that the flapper valve opens and closes in response to pressure in the annulus being at a set pressure.

An alternate method of cementing a wellbore is disclosed and that includes cementing a portion of a casing string that is inside the wellbore by directing a flow of cement slurry into the casing string, through the casing string, and into an annulus between the casing string and walls of the wellbore from a lower end of the casing string. The example method also includes introducing a spacer fluid into the annulus, and flowing the spacer fluid downhole to a reverse stage cementing sub that is disposed in the casing string above an upper level of the portion of the casing string, directing the spacer fluid to inside the casing string through a selectively openable and closeable valve included with the reverse stage cementing sub, injecting cement slurry into the annulus above the spacer fluid, closing the valve included with the reverse stage cementing sub, initiating a timer with a timer duration at least as great as a time for the valve to move from an open configuration to a closed configuration, and creating an obstruction that retains the valve in the closed configuration after expiration of the timer duration. In some examples, the valve opens and closes in response to pressure in the annulus. The method further optionally includes lowering the pressure in the annulus to close the valve. In an alternative, the valve is closed at about when cement slurry injected into the annulus above the spacer fluid reaches the reverse stage cementing sub. In an embodiment, flowing the spacer fluid downhole in the annulus ensures that formation fluid having entered into the annulus from a formation surrounding the wellbore is forced from the annulus.

Also disclosed is a system for cementing a wellbore, and which includes a housing integrally formed in a casing string, a valve formed on a sidewall of the housing selectively changeable between open and closed configurations in response to a pressure in an annulus between the casing string and sidewalls of the wellbore, a timer that selectively completes a timer sequence having a timer duration that is at least about as great as a time span for the valve to change from the open configuration to the closed configuration, a sleeve axially slideable in the housing to a position that maintains the valve in the closed configuration, and a sleeve actuator coupled with the sleeve and that is initiated upon completion of the timer duration. In an example, the system also includes an RFID sensor that is responsive to an RFID tag being proximate to the valve. Embodiments exist where the valve is a planar flapper element that covers an opening in a sidewall of the housing when the valve is in the closed configuration, and a spring attached to an end of the flapper element and to the housing and that exerts a biasing force to the flapper element urging the flapper element over the opening. The spring is alternatively calibrated so that the flapper element is urged away from the opening when pressure in the annulus is above a set pressure and the flapper element is urged towards the opening when pressure in the annulus is below the set pressure. In one embodiment, a stack of Belleville washers are in the sleeve actuator, and that selectively expand from a compressed configuration into an expanded configuration when the timer sequence is complete.

BRIEF DESCRIPTION OF DRAWINGS

Some of the features and benefits of the present invention having been stated, others will become apparent as the description proceeds when taken in conjunction with the accompanying drawings, in which.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of a cited magnitude. In an embodiment, the term "substantially" includes +/−5% of a cited magnitude, comparison, or description. In an embodiment, usage of the term "generally" includes +/−10% of a cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Figure 1:
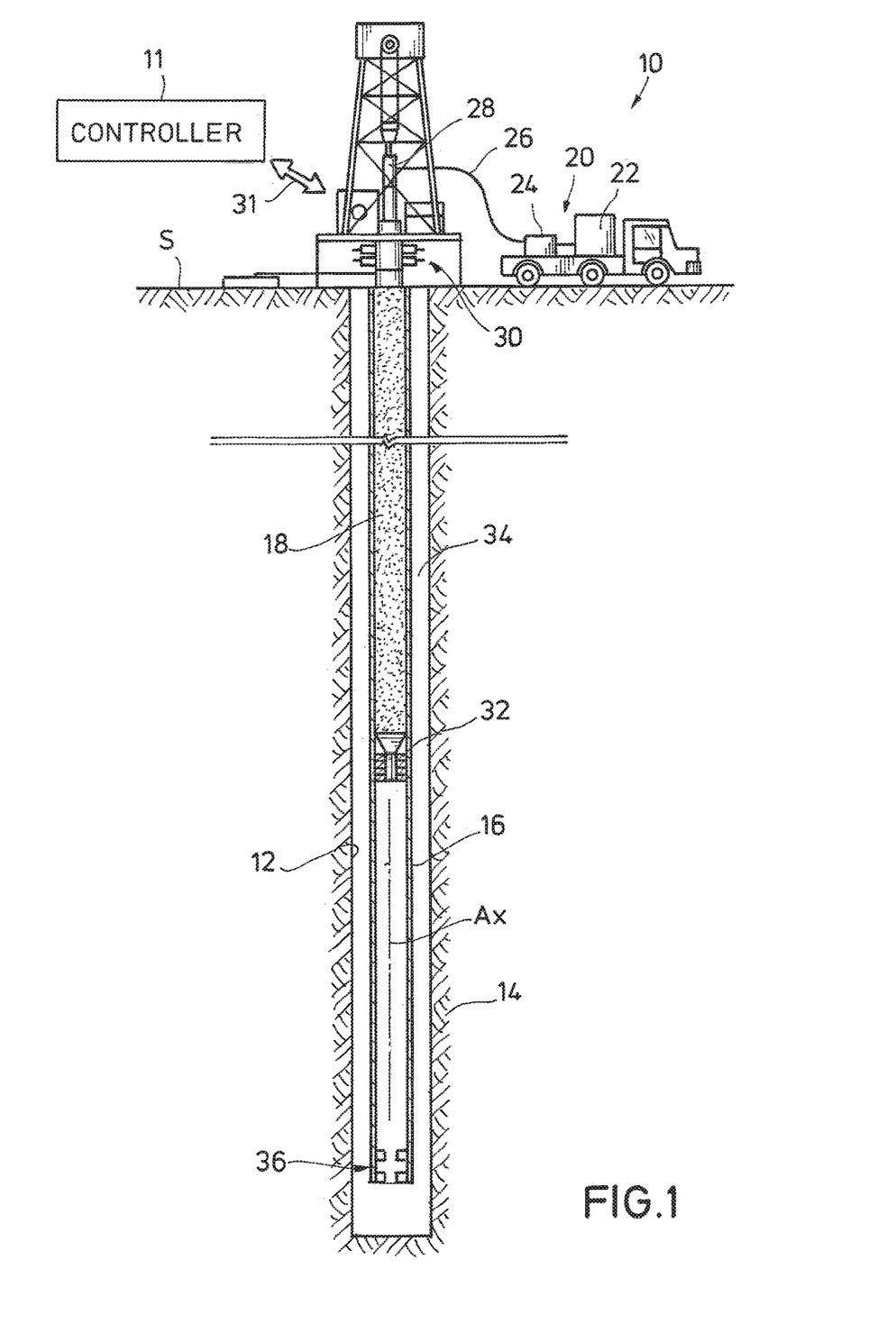
FIGS. 1-4 are side partial sectional views of steps in an example of a stage of wellbore cementing.

FIG. 1 is a partial side sectional view of an example of using a cementing system 10 that is equipped with a controller 11 to cement a wellbore 12 shown formed within a formation 14. A casing string 16 is shown inserted into the wellbore 12, and in which cement slurry 18 from a cement truck 20 is being injected. A reservoir 22 on the cement truck 20 contains an amount of the cement slurry 18, also on the cement truck 20 is a pump 24 for pressurizing the cement slurry 18. In an example embodiment when on an offshore drilling rig (not shown) cement slurry is contained in a cement slurry batch mixing tank, which alternatively includes an attached reservoir.

A line 26 connects a discharge of the pump 24 to a cement head 28 shown mounted above a wellhead assembly 30 on surface S. The cement slurry 18 flows into the wellhead assembly 30 from the cement head 28, through a main bore (not shown) in the wellhead assembly 30 the cement slurry 18 makes its way into the casing string 16. An optional communication means 31 is shown for communicating between controller 11, other components of the system 10, and to within the wellbore 12. Inside the casing string 16 the cement slurry 18 forms a column, a lower plug 32 is shown on a lower end of the column of cement slurry 18. The column of cement slurry 18 exerts a force onto the lower plug 32 that in turn urges fluids (not shown), such as drilling fluids within the casing string 16, downhole and out through an open end on the bottom of the casing string 16, and into an annulus 34 shown between casing string 16 and sidewalls of the wellbore 12. A shoe track 36 is provided inside casing string 16 and on its lower end, which as described below provides a landing surface for the lower plug 32 and means for restricting backflow of cement slurry 18 in the annulus 34 back into the casing string 16.

Figure 2:
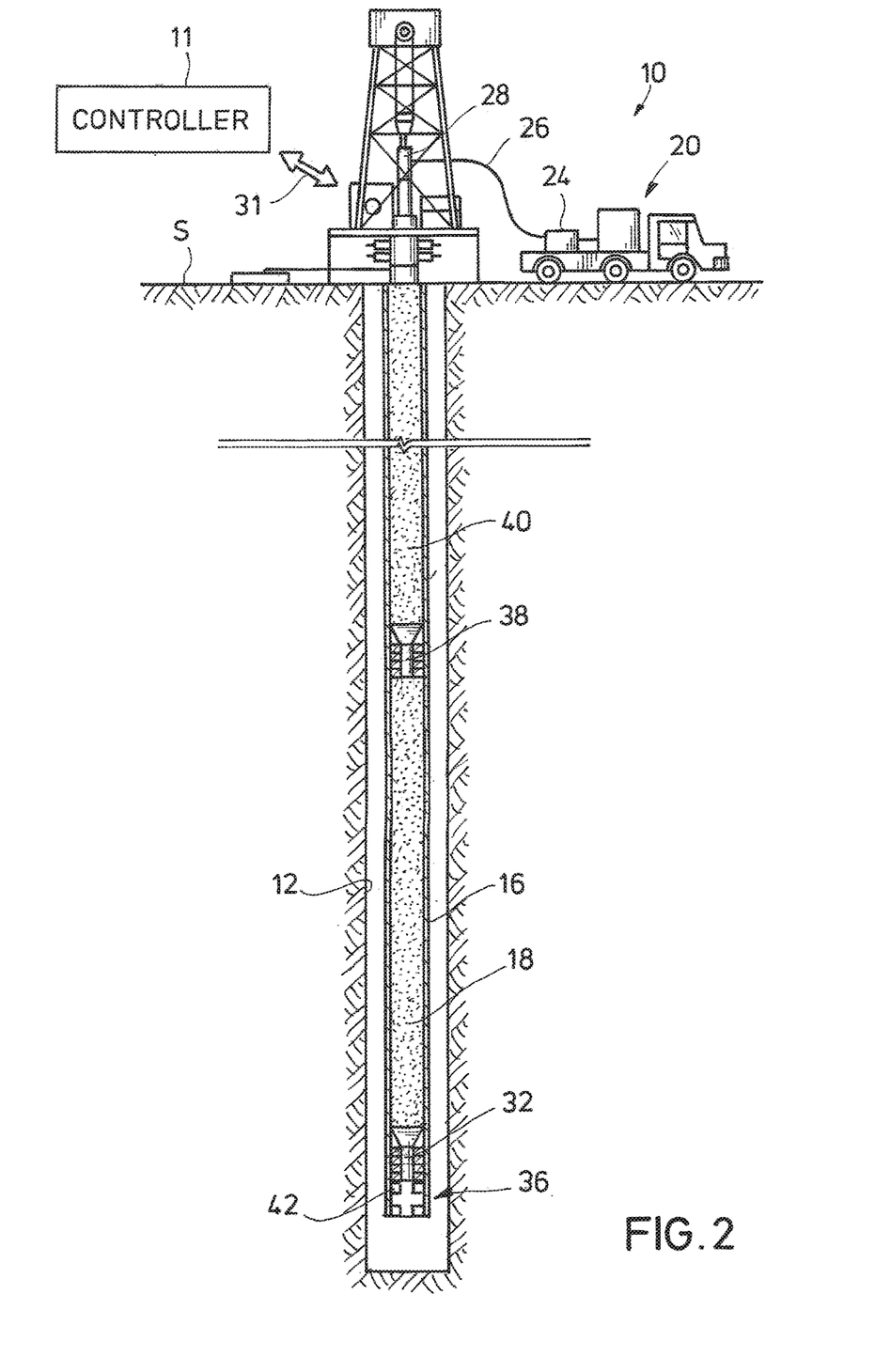

A subsequent step of the example of cementing the wellbore 12 shown in FIG. 1 is illustrated in FIG. 2 where lower plug 32 has landed on the shoe track 36, and an upper plug 38 has been added into the casing string 16 and depicted on an upper end of the column of the cement slurry 18. A displacement fluid 40 is shown inside the casing string 16 and on an upper end of the upper plug 38; pressurization and/or static head of the displacement fluid 40 provides a driving means for urging plugs 32, 38 and cement slurry 18 downhole. As illustrated in the example of FIG. 2, a float collar 42 is provided on the upper portion of the shoe track 36, and the lower plug 32 is landed on an upper end of the float collar 42.

Figure 3:
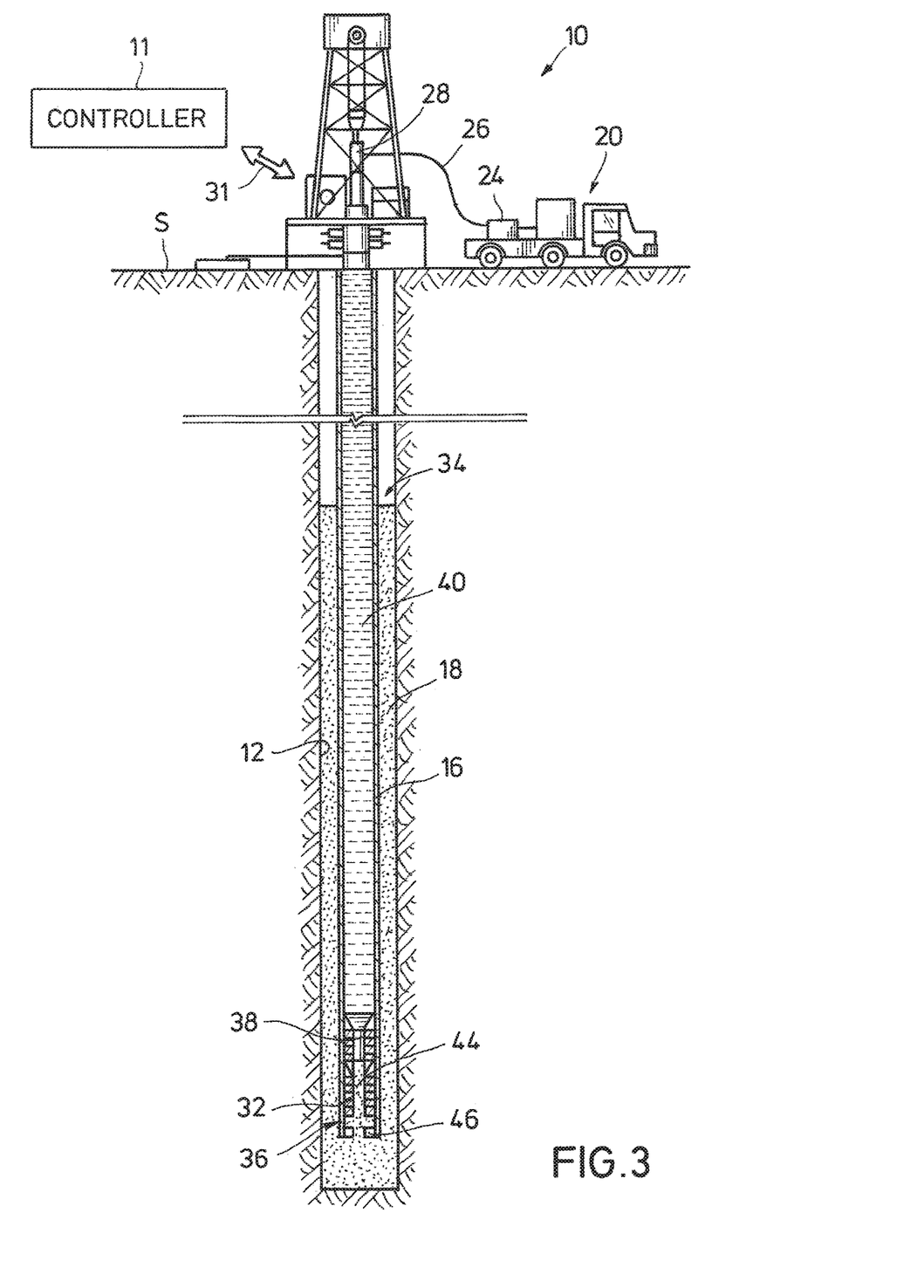

A further step of the example cementing operation is shown in a side sectional view in FIG. 3 illustrating that the pressure and/or force exerted by the displacement fluid 40 onto the cement slurry 18 ruptures a mid-portion of the lower plug 32 to create a passage 44 extending axially through lower plug 32. The cement slurry 18 flows through the passage 32, the shoe track 36, and out into the annulus 34. As shown, an upper level of the cement slurry 18 and the annulus 34 is above the upper plug 38.

Figure 4:
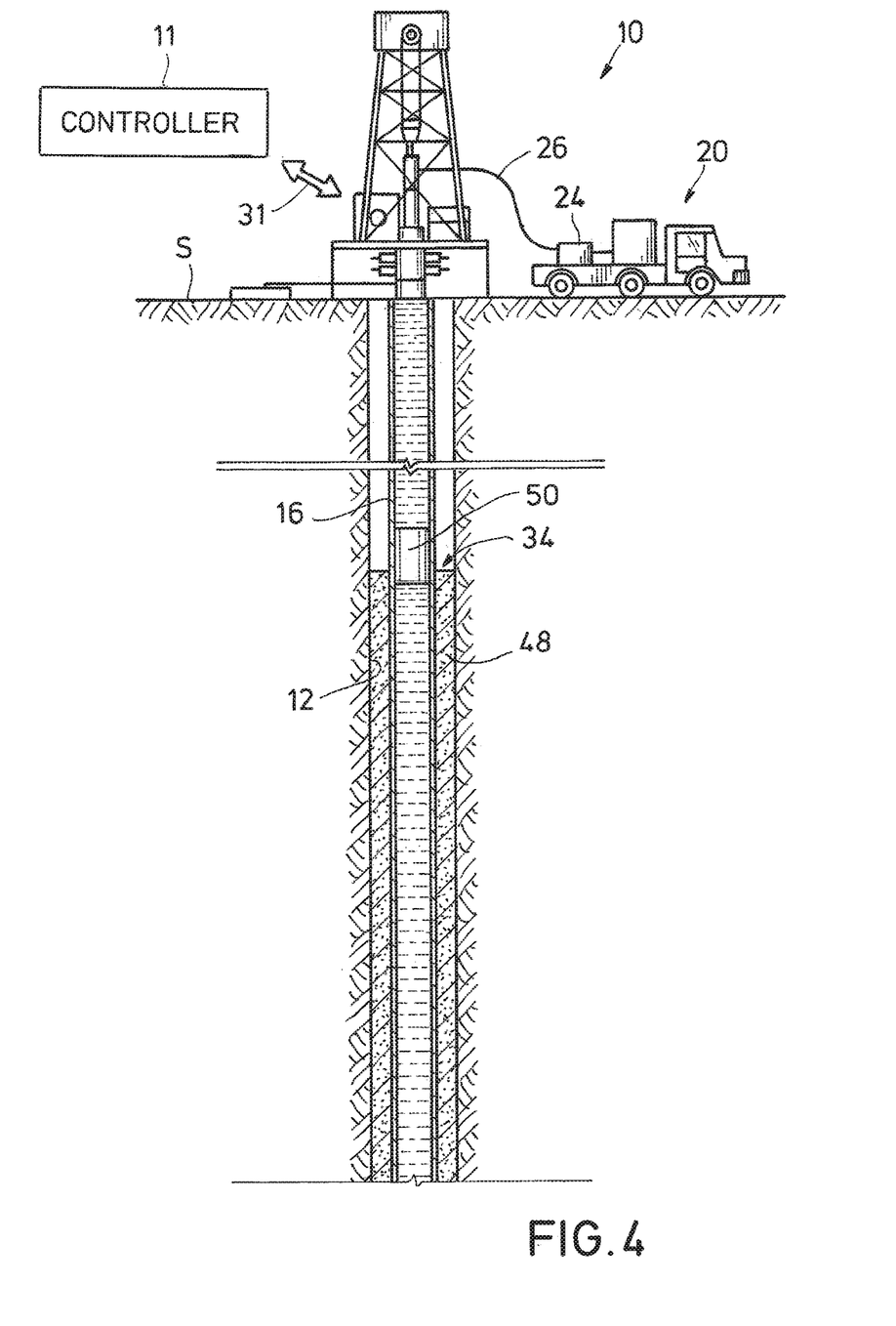

In the example of FIG. 4 the cement slurry 18 shown injected into the annulus 34 in FIG. 3 has cured and transformed from a flowable substance into one that is substantially solid to form a set cement 48. Further shown in FIG. 4 is a reverse stage cementing sub 50 integrally provided in the casing string 16 and above an upper end of the column of the set cement 48. Examples exist where the reverse stage cementing sub 50 is adjacent the upper end of the set cement 48. The cementing operation of FIGS. 1-4 is commonly known as a "long way" cementing operation, and which in an embodiment is a first stage of cementing the wellbore 12. Alternatives exist where the cementing operation of FIGS. 1-4 is a second or later stage of cementing.

Figure 5:
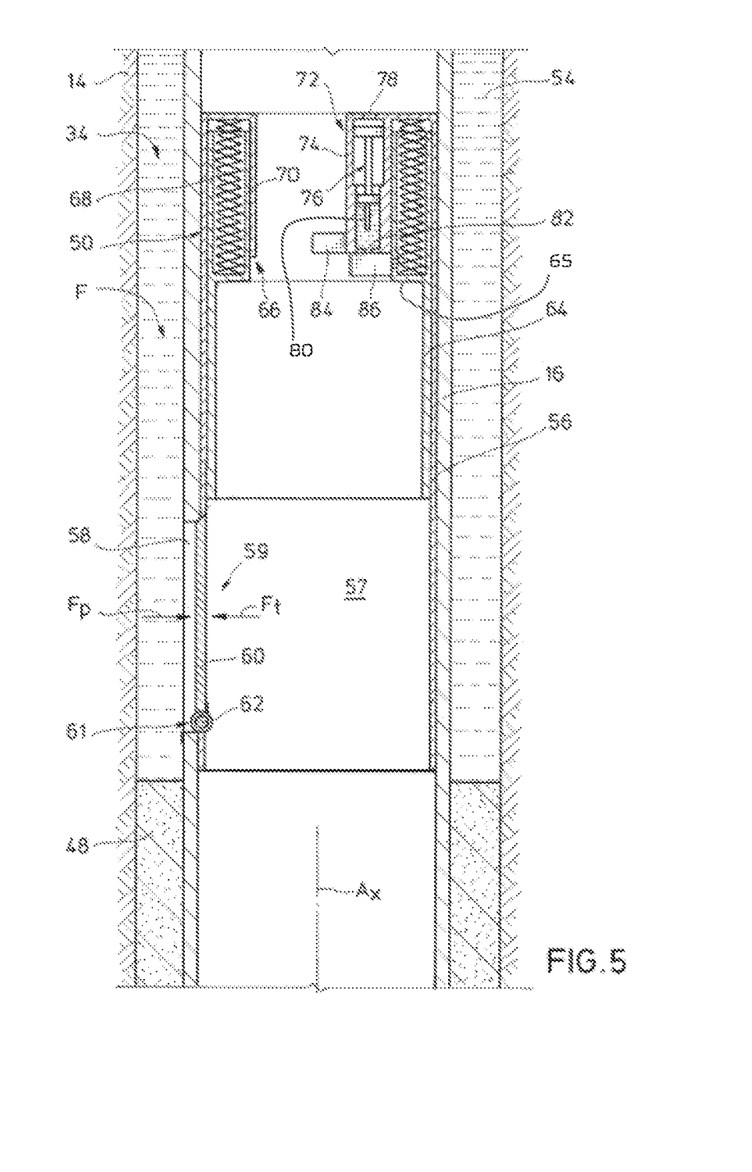
FIG. 5 is a side partial sectional view of an example of a reverse stage cementing sub for use in a cementing stage subsequent to that of FIGS. 1-4.

An example of a stage of cementing is illustrated in FIGS. 5-9 that is subsequent to the stage illustrated in FIGS. 1-4, and which in an embodiment is a second or later stage of cementing. Shown in FIGS. 5-9 is an example of cementing in which the flow path of fluids and slurry traveling downhole is first through the annulus 34, and the return back uphole is within the casing string 16. Depicted in a side sectional view in FIGS. 5-9 is a portion of the casing string 16 having an example of the reverse stage cementing sub 50 that is shown in detail. Referring to FIG. 5, in the example shown an amount of wellbore fluid 54 is in the annulus 34 and above the upper end of the set cement 48. Embodiments exist where included with the wellbore fluid 54 is fluid F from the formation 14 that may have seeped into the annulus 34 subsequent to a prior stage of cementing.

In the example of FIG. 5, the reverse stage cementing sub 50 includes an annular housing 56 whose opposing axial ends couple with respective portions of the casing string 16. A chamber 57 is formed inside of housing 56 and that is in communication with inside of casing string 16. An opening 58 is formed radially through a sidewall of housing 56 through which the annulus 34 and chamber 57 are in selective communication. A flapper valve assembly 59 is shown mounted onto a sidewall of housing 56 and adjacent opening 58. Included with flapper valve assembly 59 is a planar flapper element 60 shown adjacent opening 58 and generally in a plane parallel with axis $A_X$ of casing string 16; in this orientation flapper element 60 blocks communication through opening 58. Flapper element 60 is shown coupled inside housing 56 by an example of a hinge assembly 61. A coiled spring 62 is included with the hinge assembly 61, and is shown attached to an end of flapper element 60. In the example of FIG. 5, spring 62 is oriented generally along a circumference of housing 56; examples other orientations of the spring 62 exist, such as extending parallel with or oblique to axis $A_X$. In a non-limiting example, spring 62 is pre-stressed and exerts a torque t onto flapper element 60 that urges flapper element 60 against sidewall of housing 56 and over opening 58; a force $F_t$ is shown directed radially outward and which a force applied to flapper element 60 and generated by torque t. In the example of FIG. 5 flapper valve assembly 59 is in a closed configuration.

An annular sleeve 64 is shown in FIG. 5 spaced axially above an upper end of the flapper element 60 and which is slideable along axis $A_X$. A sleeve retainer ring 65 is alternatively provided on an end of sleeve 64. On a side of retainer ring 65 opposite sleeve 64 is a biasing means 66. Biasing means 66 in FIG. 5 is made up of stacks of Belleville washers 68 shown axially mounted within housings 70. In the example of FIG. 5, the Belleville washers 68 are in a compressed configuration. Housings 70 telescope with respect to one another upon expansion of the Belleville washers 68, and which axially expands biasing means 66. Also schematically illustrated within the reverse stage cementing sub 50 is a hydraulic timer 72 that is set to have a time sequence with a duration at least that of the time required for closing the flapper element 60 from an open configuration (FIG. 6) into its closed configuration of FIG. 5. Various embodiments of a hydraulic timer 72 are considered herein, one of which is shown having a cylinder 74 with a piston assembly 76 that is moveable within the cylinder 74. A port 78 is formed on one end of housing 74 and which provides an ambient fluid to contact an exposed surface area of an upper piston. A lower piston is included having a surface area less than the upper piston. A lower surface of lower piston is in contact with a fluid 80 inside cylinder 74. Fluid 80 below lower piston is in communication with ambient through a port 82 shown formed on a side of housing 70 opposite from the aperture 78. In a non-limiting example of operation port 82 is maintained in a closed configuration until it is desired to initiate operation of the hydraulic timer 72. Upon which time the fluid 80 flows from port 82 and for a period of time as least that of the timing sequence.

Still referring to FIG. 5, also included with the example of the reverse stage cementing sub 50 is a radio frequency identification ("RFID") sensor 84 shown coupled with a release latch 86. Release latch 86 when activated removes retaining means that keep the Belleville washers 68 in their compressed state and allow the washers 68 to expand. It is within the capabilities of one skilled to form a release latch 86 that accomplishes the functions described herein. In the example of FIG. 5, a force $F_P$ shown directed radially inward against flapper element 60 and that is generated by pressure in annulus 34 is exceeded by the force $F_t$ exerted by coil spring 62 so that the flapper element 60 is maintained in the closed configuration and blocks communication between annulus 34 and inside of the housing 56 of the reverse stage circulating sub 50. In one non-limiting example, a coil spring 62 is calibrated so that the force $F_P$ exceeds the torque t exerted onto flapper element 60 at a designated set pressure within annulus 34. In this example, the flapper valve assembly 59 is selectively changed between the open and closed configurations by adjusting pressure in the annulus 34 to above and below the designated set pressure.

Figure 6:
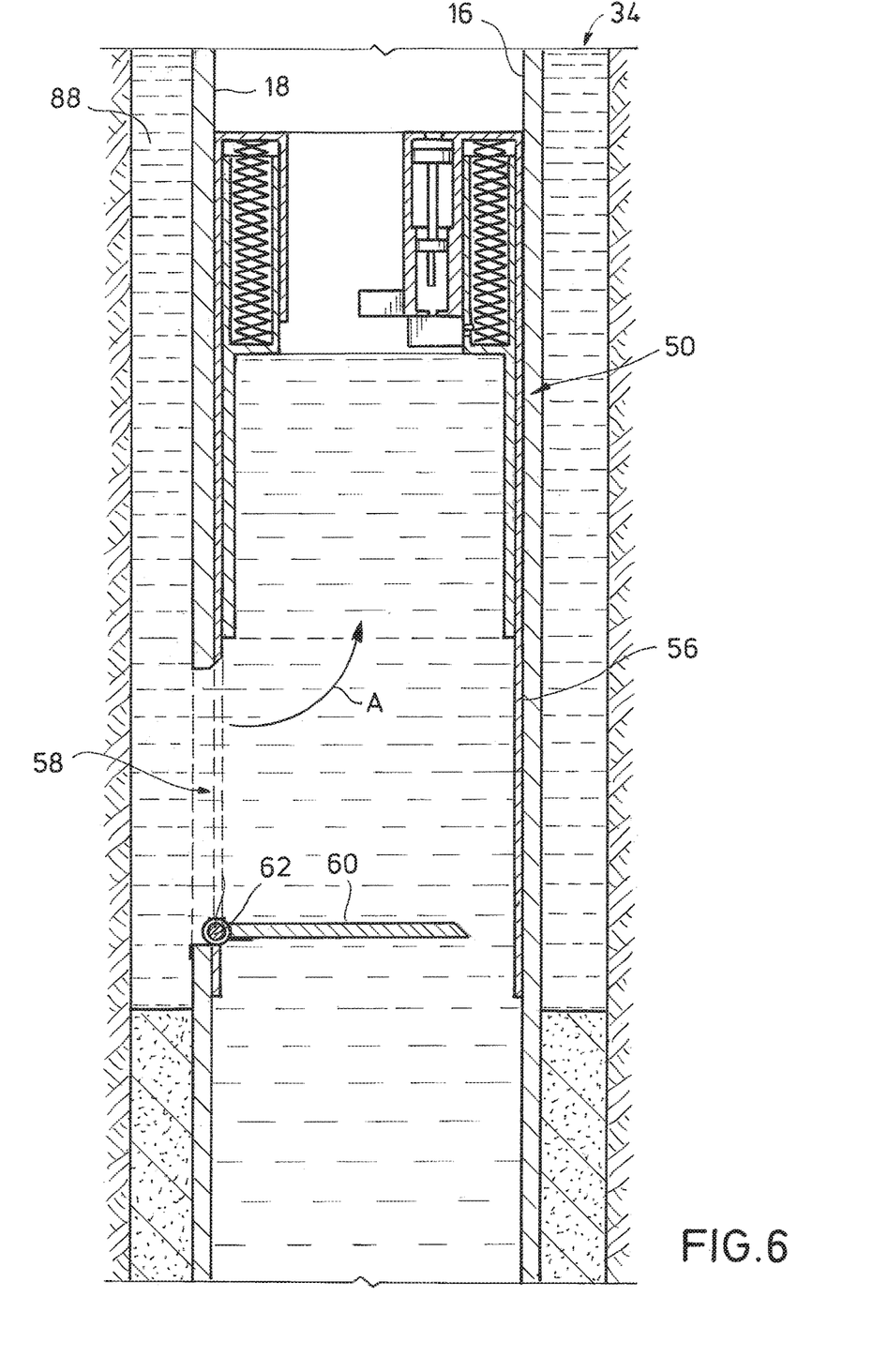
FIGS. 6-9 are side partial sectional views of steps in an example of operation of the reverse stage cementing sub of FIG. 5.

Referring now to FIG. 6, in a non-limiting example of operation pressure within annulus 34 is at above the set pressure so that force $F_P$ exceeds force $F_t$ and forces the flapper element 60 into its open configuration and away from the opening 58. In the open configuration fluid within annulus follows the flow path shown by arrow A to inside of the housing 56 and subsequently into the casing string 16. In the example of FIG. 6, a spacer fluid 88 has been introduced into the annulus 34 from surface S (FIG. 1) and at a pressure above the set pressure which results in the wellbore fluid 54 (FIG. 5) urging the flapper element 60 into its open configuration so that the fluid flows upward within casing string 16. As noted above, the flow of the spacer fluid selectively removes the wellbore fluid 54 or formation fluid from within annulus and away from set cement 48 within annulus 54. It is within the capabilities of one skilled to select or design a coil spring 62 having characteristics (such as a spring constant) that allows the flapper element 60 move into an open or closed configuration at or about the set pressure.

Figure 7:
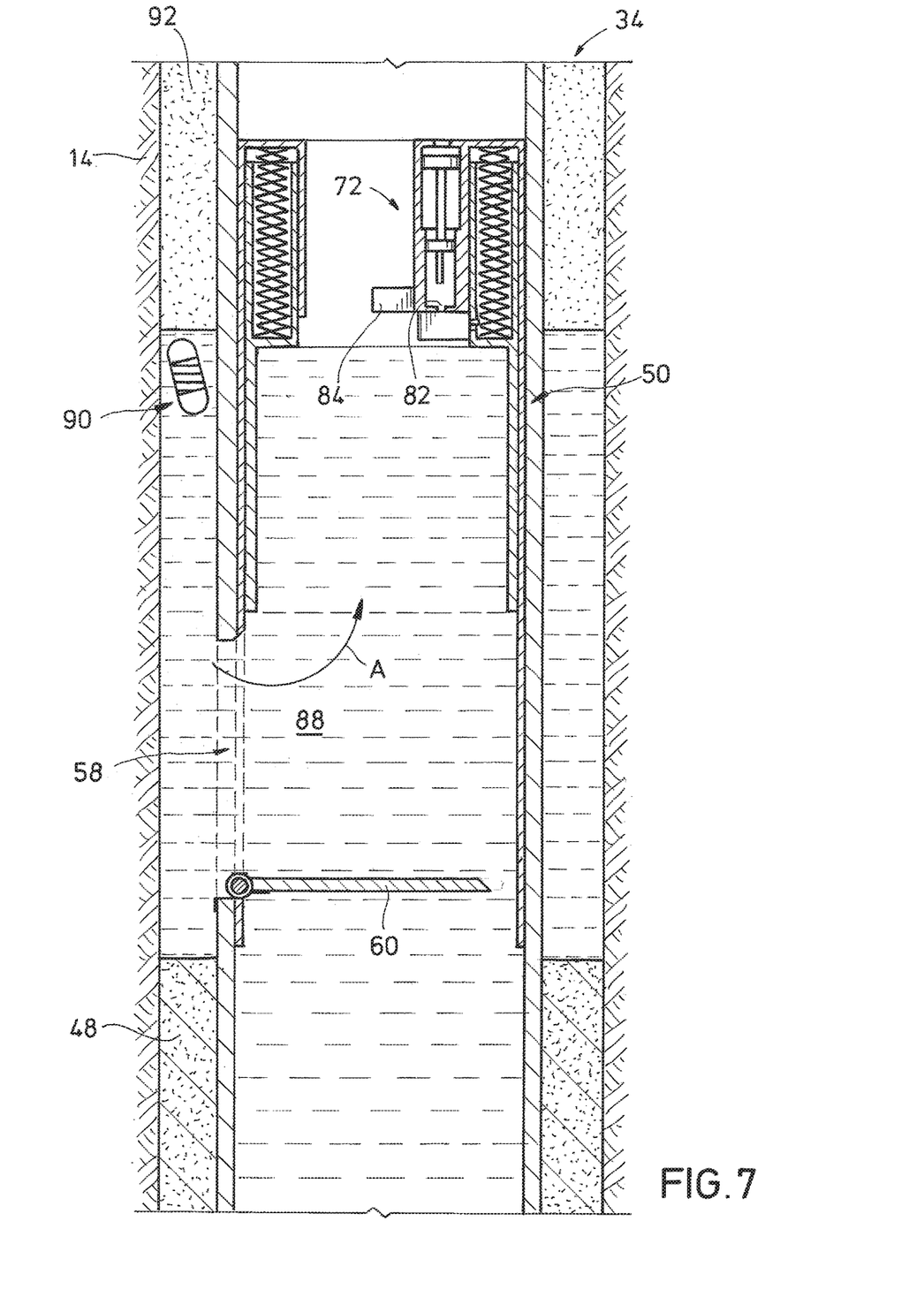
Figure 8:
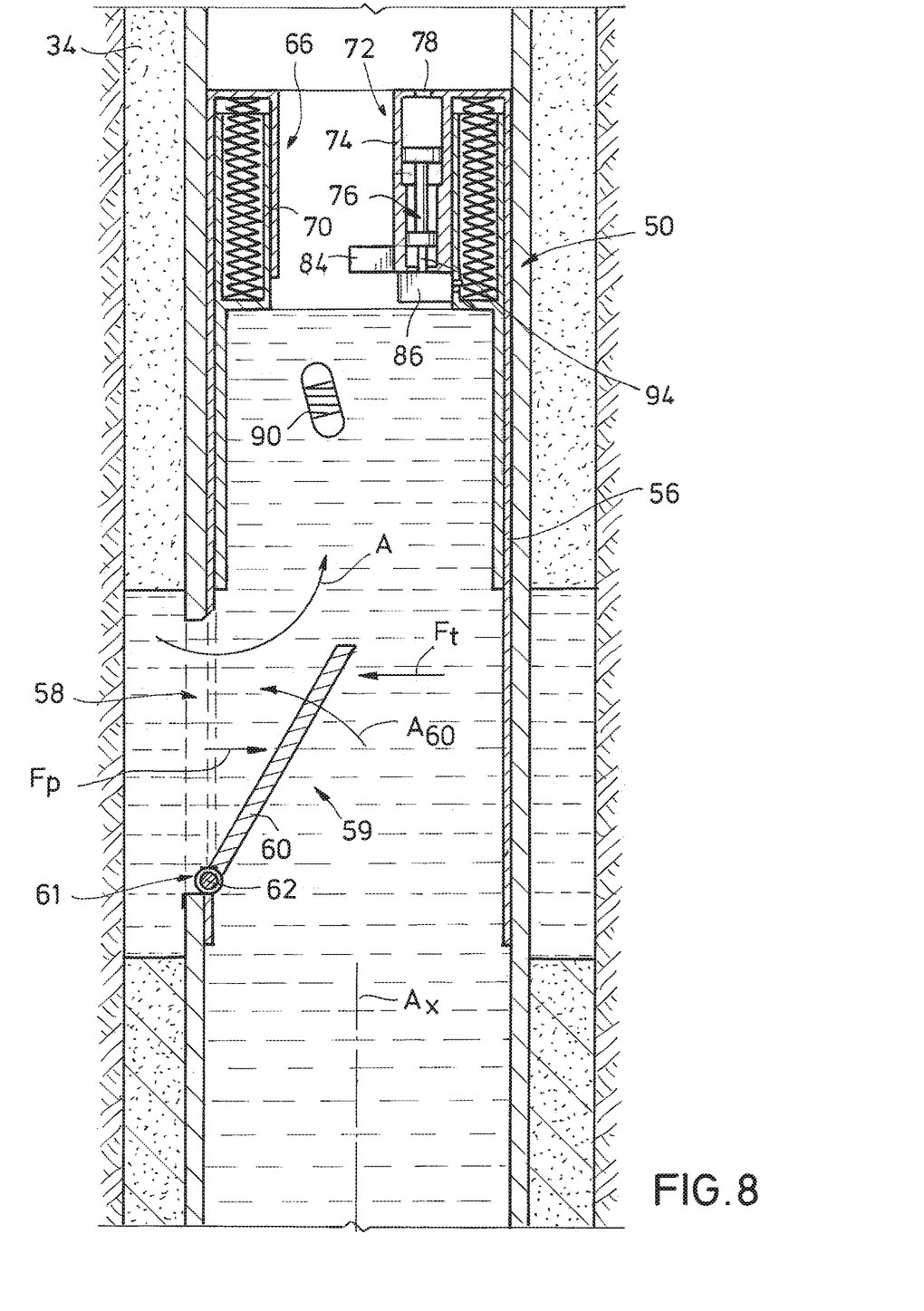

Shown in the example of cementing illustrated in FIG. 7 is an RFID tag 90 within annulus 34 having been dropped into the annulus 34 from surface S (FIG. 1). In this example, the RFID tag 90 was dropped in the annulus 34 at a strategic time, and ahead of an amount of cement slurry 92 that was also introduced into the annulus 34. A later point in time of the cementing operation is shown schematically in FIG. 8 and illustrating RFID tag 90 proximate to the reverse stage cementing sub 50. In this example the presence of RFID tag 90 is sensed by the RFID sensor 84. By sensing the presence of the RFID tag 90 the sensor 84 initiates operation of the hydraulic timer 72 and allows the piston assembly 76 to be moved within the housing 70 as described above. Illustrated in the example of FIG. 8 is that pressure within annulus 34 is reduced below the set pressure so that force $F_t$ exceeds force $F_P$ and causing the flapper element 60 to rotate back towards its closed configuration of FIG. 5. As noted above, the time required for the flapper element 60 to be moved back into its closed configuration of FIG. 5 from its open configuration of FIG. 7 is dependent upon the spring constant of coiled spring 62, as well as pressure and fluid flow within annulus 34. It is believed that the time required to allow the flapper element 60 to return to the closed configuration is within the capabilities of one skilled in the art. As shown, the hydraulic timer 72 having been set to coincide with the time span for closing flapper valve assembly 59 provides a delay equal to that closing time.

Figure 9:
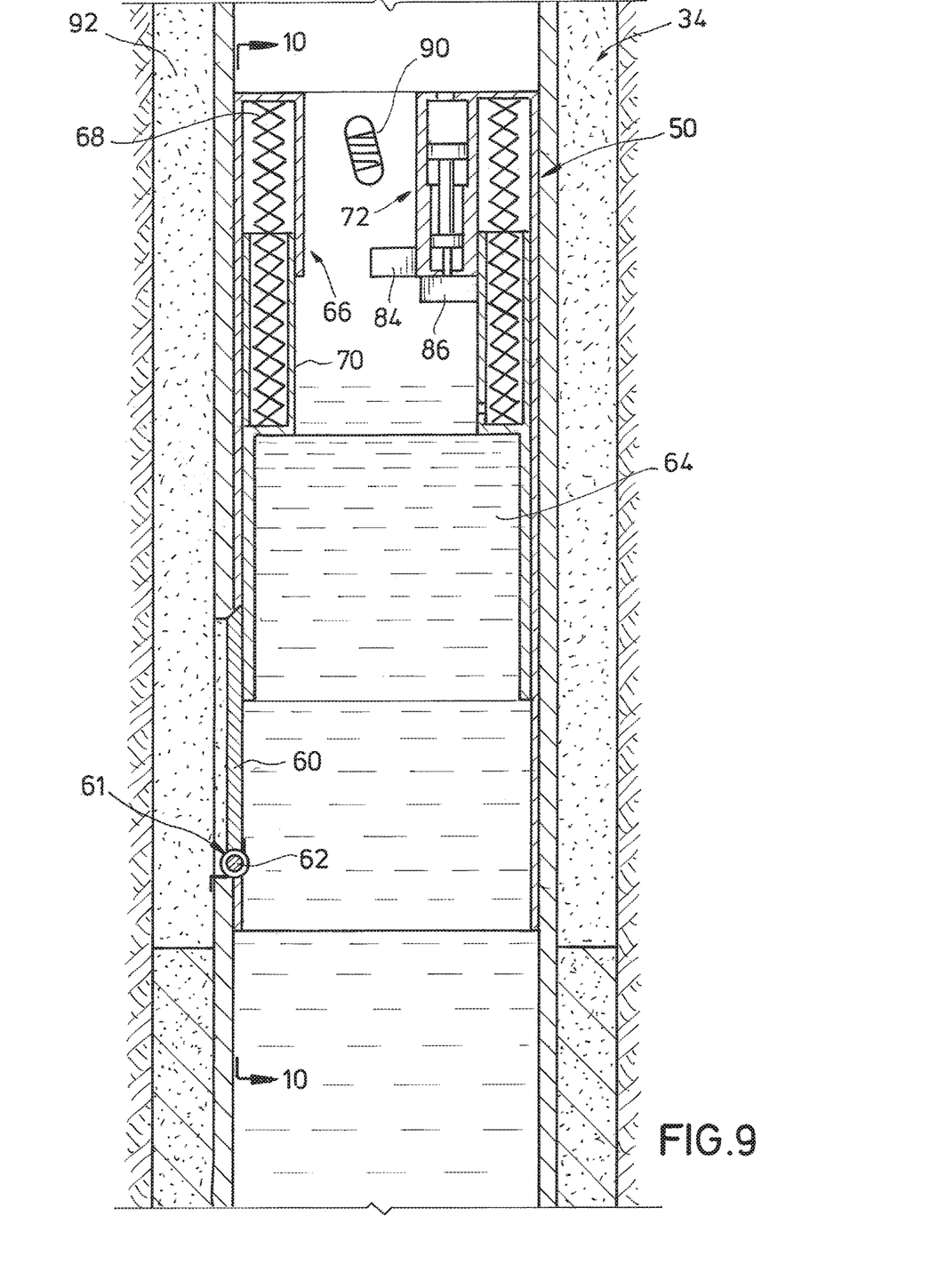

Upon expiration of that time span the hydraulic timer 62 actuates the release latch 86 and as shown in FIG. 9 allows axial expansion of the biasing means 66 that in turn urge the sleeve 64 axially downward and adjacent to the flapper element 60. In the example shown sleeve 64 is radially inward of flapper element 60 and prevents flapper element 60 from rotating or pivoting into its open configuration, and retains the flapper element 60 in its closed configuration. Further the retaining means 66 continue to exert an axial force onto sleeve 64 to maintain sleeve 64 adjacent flapper element 60. An advantage afforced by the hydraulic timer 72 provides a timed sequence of closing the valve 63 to prevent inflow of the cement slurry into the housing 56 while at the same time removing substantially all of the fluid 88 within annulus 34. Further the hydraulic timer 72 provides for the use of an RFID tag 94 that results in accurate closing times based upon the particular substances within the annulus 34 and without a premature activation of the sleeve 64 before the flapper element 60 is in its closed configuration. Referring back to FIG. 8, a pin 94 is shown schematically attached to the piston assembly 76 and which provides an actuation communication to initiate operation of the actuator 86.

Figure 10:
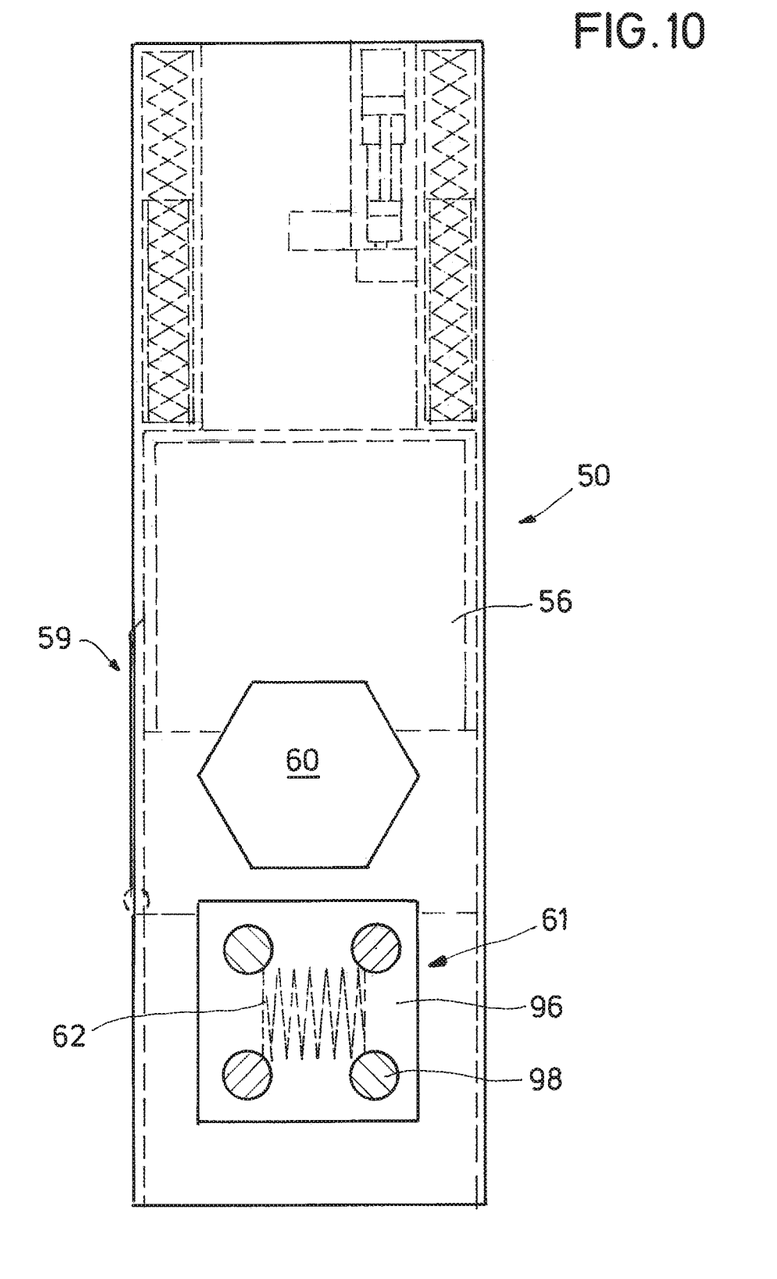
FIG. 10 is a side elevational view of an example of the reverse stage cementing sub of FIG. 5 and taken along lines 10-10 of FIG. 9.

A plan view of the reverse stage circulating sub 50 is shown in FIG. 10 and which is taken along lines 10-10 of FIG. 9. As shown, flapper element 60 has a generally hexagonal outer periphery and is spaced axially from hinge assembly 61 that mounts through the sidewall of housing 56. Also included with hinge assembly 61 is a base plate 96 mounted to housing 56 by fasteners 98. In this example coil spring 62 is disposed between rows of fasteners 98.

Figure 11A:
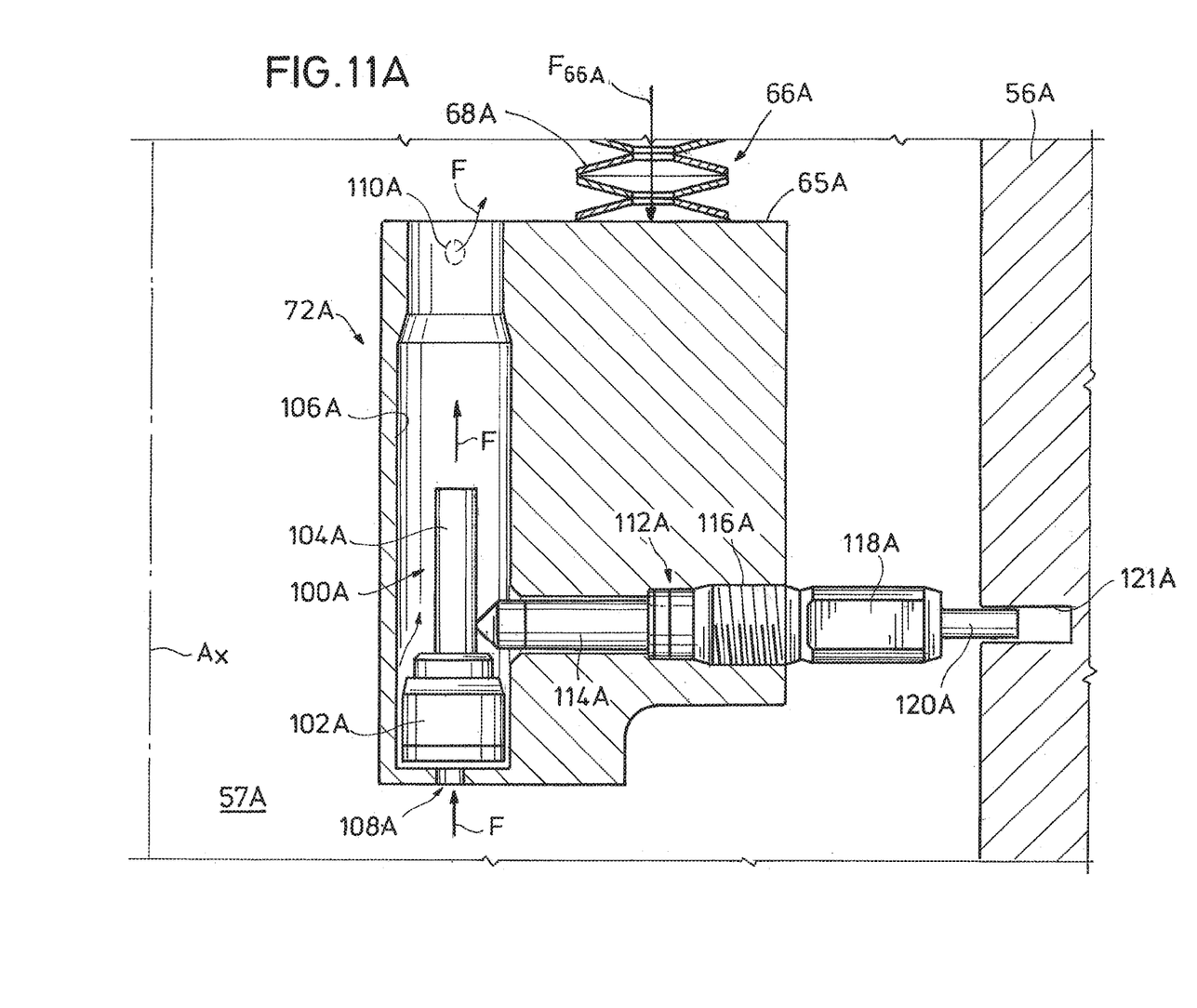
FIGS. 11A and 11B are side partial sectional views of an alternate example of a hydraulic timer in operation.

Shown in a side partial sectional view in FIG. 11A is an alternate example of a hydraulic timer 72A shown having an annular flow restrictor 100A that includes a base 102A and elongated main body portion 104A extending axially from the base 102A. In this example base 102A and body 104A are substantially coaxial with one another and arranged generally parallel with axis $A_X$. In the illustrated embodiment flow restrictor 100A is disposed in a channel 106A formed axially through a portion of sleeve ring 65A. The base 102A of the example flow restrictor 100A has a diameter greater than a diameter of main body portion 104A and less than that of chamber 106A. An inlet port 108A is shown formed through ring 65A and that intersects channel 106A on a side of base 102A distal from biasing means 66A; which is shown with its stack of Belleville washers 68A in a compressed configuration that exert a force against sleeve ring 65A. An exit port 110A is shown in dashed outline that intersects channel 106A on a side of flow restrictor 100A opposite from inlet port 108A. An example of a shear pin assembly 112A is included in the example of FIG. 11A, and which includes an elongated switch pin 114A having a free end shown projecting a distance radially into the channel 106A. Switch pin assembly 112A mounts in a bore 116A shown formed inside the sleeve ring 65A, and that extends radially from the channel 106A to an outer diameter of sleeve ring 65A. Also included with shear pin assembly 112A is an elongate shear pin stem 118A shown substantially coaxial with switch pin 114A and threadingly secured within bore 116A. In the example shown shear pin stem 118A circumscribes a portion of switch pin 114A, and switch pin 114A is slideably moveable within shear pin stem 118A in a direction radial to axis $A_X$. Further in this example an outer diameter of shear pin stem 118A increases along a portion of its length so that its outer surface along that portion is frusto-conical. The diameter of shear pin stem 118A between the frusto-conical portion and the outer diameter of sleeve ring 65A remains substantially constant and has a generally cylindrical configuration. Shear pin stem 118A of FIG. 11A includes second and third frusto-conical sections disposed adjacent one another and on a side of the cylindrical portion opposite switch pin 114A. The diameter of the shear pin stem 118A reduces along the second frusto-conical section with distance from the switch pin 114A, and increases along the third frusto-conical section with distance from the switch pin 114A. The shear pin stem 118A includes a fourth frusto-conical section on its end opposite the switch pin 114A. A portion of the shear pin stem 118A between the third and fourth frusto-conical sections has a substantially constant diameter and a cylindrical shape. A shear pin 120A is shown disposed generally coaxial within shear pin stem 118A, a portion of shear pin 120A telescopes out from shear pin stem 118A and projects from the end of shear pin stem 118A opposite the switch pin 114A. An end of the portion of shear pin 120A that telescopes from shear pin stem 118A and that is distal from shear pin stem 118A is shown inserted into a groove 121A formed radially into a sidewall of housing 56A. Interaction between the shear pin 120A and groove 121A counter the above described force that is exerted onto the sleeve ring 65A from the biasing means 66A and maintain the sleeve ring 65A in its present position. In an alternative, sleeve ring 65A includes multiple channels 106A arranged along its circumference and that each have a flow restrictor 100A, bore 116A, and shear pin assembly 112A engaged with groove 121A in the same or similar manner to that of FIG. 11A.

Figure 11B:
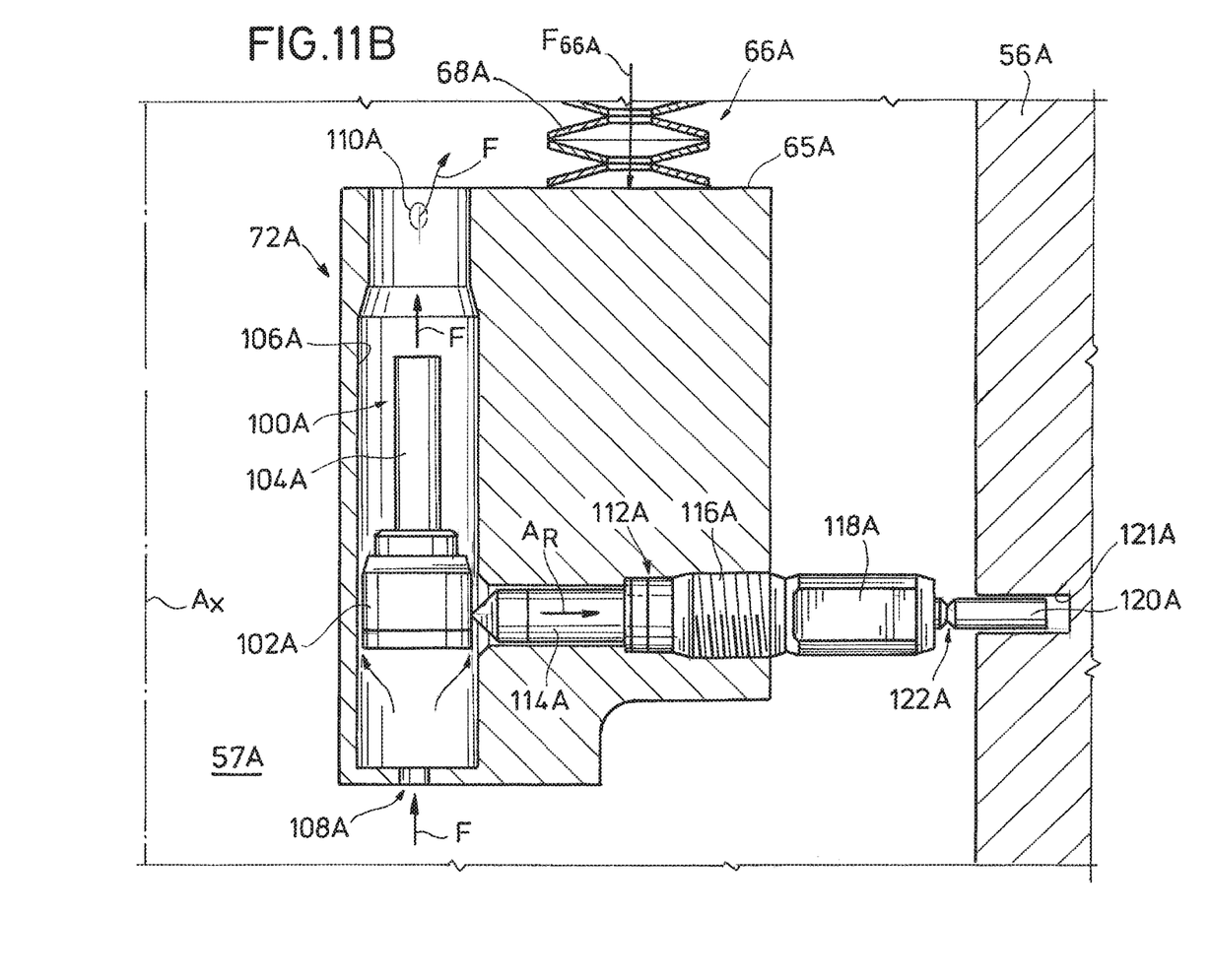

In a non-limiting example of operation of the hydraulic timer 72A of FIG. 11A, a flow of fluid F is directed into inlet port 108A in response to sensing the RFID tag 90 (FIG. 8). Examples of a location of the RFID tag 90 to initiate the flow of fluid F through inlet port 108A include inside annulus 34 (FIG. 5) and adjacent reverse stage cement sub 50 and inside chamber 57. Alternatively, the flow of fluid F through inlet port 108A occurs a period of time after the RFID tag 90 is sensed. Fluid F entering the channel 106A through inlet port flows around base 102A through an annulus between base 102A and sidewalls of channel 106A; and then flows inside channel past the flow restrictor 100A and to exit port 110A. As shown in FIG. 11B, forces from the flow of fluid F urge the flow restrictor 100A upwards in the channel 106A and towards exit port 110A. Not to be bound by theory, the forces exerted on the flow restrictor 100A include buoyancy forces, form drag forces, skin friction forces, and combinations. A diameter of the base 102A as shown is dimensioned so that an outer surface of base 102A is radially past a location in chamber 106A occupied by a portion of switch pin 114A inside chamber 106A, which puts switch pin 114A into interfering contact with base 102A when flow restrictor 100A moves inside chamber 106A between the inlet and outlet ports 108A, 110A. Further in this example, at least a portion of the forces of the flow of fluid F exerted onto flow restrictor 100A are transferred from the flow restrictor 100A onto switch pin 114A when flow restrictor 100A is moved into interfering contact with switch pin 114A as shown in FIG. 11B, and moves switch pin 114A inside of shear pin stem 118A radially away from axis $A_X$ in the direction of arrow $A_R$ into contact with shear pin 120A. Moving switch pin 114A as described above in turn slides shear pin 120A within shear pin stem 118A causing an additional length of shear pin 120A to telescope from within shear pin stem 118A. A notch 122A is included along the additional length of the shear pin 120A telescoped outward from within the shear pin stem 118A, and that was within shear pin stem 118A prior to movement of shear pin 120A causes by interfering contact between flow restrictor 100A and switch pin 114A. Notch 122A of FIG. 11B is shown as a recess that circumscribes a section of the shear pin 120A along its outer surface and reduces its cross sectional area. The reduced cross sectional area of the shear pin 120A creates a localized increase in stress resulting from the force applied by biasing means 66A along the notch 122A. Further in this example, notch 122A is dimensioned so the stresses resulting from the biasing means 66A in the shear pin 120A adjacent notch 122A exceed a yield point of the material making up the shear pin 120A and cause the shear pin 120A to fracture at the notch 122A. Fracturing the shear pin 120A removes the force or forces countering the force exerted by the biasing means 66A onto the sleeve ring 65A so that the sleeve ring 65A and sleeve 64 (FIG. 9) are urged axially downward and adjacent to flapper element 60. It is within the capabilities of one skilled to form a notch 122A having a location and dimensions so that the shear pin 120A fractures or shears in the manner described above and/or at a designated time or situation.

Alternatives of the hydraulic timer 72A exist that include one or more openable and closeable valves or orifices (not shown) to selectively allow the flow of fluid F to inlet port 108A and/or from outlet port 110A. An actuator(s) (not shown) for actuation of the valve(s) and or orifice(s) is/are optionally included and that is/are in communication with RFID sensor 84, a controller downhole (not shown), or controller 11 outside of wellbore 12 (FIG. 1). The types of fluids making up the flow of fluid F include liquids, gases, vapors, multi-phase flows, slurries, water based fluids, and hydrocarbon based fluids. Examples of the flow of fluid F include fluids such as spacer fluid 88 and other fluids flowing within cementing sub 50 (FIG. 8) and any of the other fluids listed herein. In an embodiment, a source of the flow of fluid F is a vessel (not shown) disposed downhole and maintained at conditions (such as a designated pressure and/or temperature), and having properties (such as density and/or viscosity) that when directed into the channel 106A cause movement and fracture of the shear pin 120A as described above. Optionally, means are employed so that fluid from chamber 57A is utilized as a source of the flow of fluid F; example means include bellows and/or systems with different sized pistons configured to create a pressure differential to induce and or enable flow of fluid from chamber 57A into channel 106A through inlet port 108A.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. For example, in an alternative to the pressure operated valve for allowing flow into the reverse stage cementing sub 50 is made up of concentric sleeves with apertures spaced at locations along their respective circumferences that are registered by strategic rotation of one or both of the concentric sleeves. This and other similar modifications will readily suggest themselves to those skilled in the art, and are intended to be encompassed within the spirit of the present invention disclosed herein and the scope of the appended claims.

What is claimed is:

1. A method of cementing a wellbore comprising:
providing communication between an annulus disposed between a casing string and walls of the wellbore and inside of the casing string through a reverse stage cementing sub that is at a depth adjacent an upper end of a column of set cement formed in the annulus from a previous cementing operation;
ensuring the annulus is free of fluids originating from a formation surrounding the wellbore by generating a flow from the annulus into the casing string through the reverse stage cementing sub;
introducing a cement slurry into the annulus;
putting a pressure actuated valve into a closed configuration to block communication between the annulus and casing string through the reverse stage cementing sub;
maintaining the pressure actuated valve in the closed configuration; and
delaying maintaining the pressure actuated valve in the closed configuration with a hydraulic timer and for a span of time after initiating the step of putting the pressure actuated valve into the closed configuration, the span of time being an amount at least that of a duration for conducting the step of putting the pressure actuated valve into the closed configuration.

2. The method of claim 1, wherein the step of providing communication between the annulus and the casing string comprises opening the pressure actuated valve disposed in a sidewall of the reverse stage cementing sub by pressurizing the annulus.

3. The method of claim 2, wherein delaying is performed by a hydraulic timer.

4. The method of claim 3, further comprising dropping an RFID tag into the annulus, wherein when the RFID tag is proximate the reverse stage cementing sub the RFID tag sensed by an RFID sensor disposed in the reverse stage cementing sub and initiates operation of the hydraulic timer in response to sensing the RFID tag.

5. The method of claim 4, wherein putting the pressure actuated valve in the closed configuration comprises reducing pressure in the annulus to below a set pressure, and where the pressure in the annulus is lowered to below the set pressure at about the same time the RFID tag is sensed by the RFID sensor.

6. The method of claim 3, wherein upon completion of the time span a biasing means is allowed to expand from a compressed configuration and urges a sleeve axially adjacent the pressure actuated valve.

7. The method of claim 6, wherein the pressure actuated valve comprises a flapper valve mounted inside the reverse stage cementing sub by a spring that is calibrated so that the flapper valve opens and closes in response to pressure in the annulus being at a set pressure.

8. A method of cementing a wellbore comprising:
cementing a portion of a casing string that is inside the wellbore by directing a flow of cement slurry into the casing string, through the casing string, and into an annulus between the casing string and walls of the wellbore from a lower end of the casing string;
introducing a spacer fluid into the annulus, and flowing the spacer fluid downhole to a reverse stage cementing sub that is disposed in the casing string above an upper level of the portion of the casing string;
directing the spacer fluid to inside the casing string through a selectively openable and closeable valve included with the reverse stage cementing sub;
injecting cement slurry into the annulus above the spacer fluid;
closing the valve included with the reverse stage cementing sub;
initiating a timer with a timer duration equal to or greater than a time for the valve to move from an open configuration to a closed configuration; and
creating an obstruction that retains the valve in the closed configuration after expiration of the timer duration.

9. The method of claim 8, wherein the valve opens and closes in response to pressure in the annulus.

10. The method of claim 9, further comprising lowering the pressure in the annulus to close the valve.

11. The method of claim 10, wherein the valve is closed at about when cement slurry injected into the annulus above the spacer fluid reaches the reverse stage cementing sub.

12. The method of claim 8, wherein flowing the spacer fluid downhole in the annulus ensures that formation fluid having entered into the annulus from a formation surrounding the wellbore is forced from the annulus.

13. A system for cementing a wellbore comprising:
a housing integrally formed in a casing string;
a valve formed on a sidewall of the housing selectively changeable between open and closed configurations in response to a pressure in an annulus between the casing string and sidewalls of the wellbore;
a timer that selectively completes a timer sequence having a timer duration that is greater than or equal to a time span for the valve to change from the open configuration to the closed configuration;
a sleeve axially slideable in the housing to a position that maintains the valve in the closed configuration; and
a sleeve actuator coupled with the sleeve and that is initiated upon completion of the timer duration.

14. The system of claim 13, further comprising an RFID sensor that is responsive to an RFID tag being proximate to the valve.

15. The system of claim 13, wherein the valve comprises a planar flapper element that covers an opening in a sidewall of the housing when the valve is in the closed configuration, and a spring attached to an end of the flapper element and to the housing and that exerts a biasing force to the flapper element urging the flapper element over the opening.

16. The system of claim 15, wherein the spring is calibrated so that the flapper element is urged away from the opening when pressure in the annulus is above a set pressure and the flapper element is urged towards the opening when pressure in the annulus is below the set pressure.

17. The system of claim 13, wherein the sleeve actuator comprises a stack of Belleville washers that selectively expand from a compressed configuration into an expanded configuration when the timer sequence is complete.

* * * * *